United States Patent [19]

Pelton

[11] 4,191,486

[45] Mar. 4, 1980

[54] THREADED CONNECTIONS

[75] Inventor: John F. Pelton, Yorktown Heights, N.Y.

[73] Assignee: Union Carbide Corporation, New York, N.Y.

[21] Appl. No.: 940,006

[22] Filed: Sep. 6, 1978

[51] Int. Cl.$^2$ .............................................. F16B 21/20
[52] U.S. Cl. ..................................... 403/28; 403/343; 403/296; 313/357; 13/18 C
[58] Field of Search .................. 403/343, 296, 28, 30; 285/DIG. 6, 187, 334.4, 333, 334, 390, 355; 85/46; 313/357; 13/18 C

[56] References Cited

U.S. PATENT DOCUMENTS

| 2,584,640 | 2/1952 | Taylor | 403/296 |
| 2,957,716 | 10/1960 | Kaufmann | 403/296 |
| 3,612,586 | 10/1971 | Stieber | 403/296 |

*Primary Examiner*—Andrew V. Kundrat
*Attorney, Agent, or Firm*—Saul R. Bresch

[57] ABSTRACT

In a threaded connection to be loaded in an axial direction, said connection comprising two pieces (i) having coincidental axes and (ii) having different coefficients of thermal linear expansion wherein one piece is a threaded male piece and the other piece is a threaded female piece, the improvement comprising providing, at ambient temperature, a taper such that the change in radial clearance per unit of length between the opposing threads of each piece is equal to the expression $A\Delta T \tan \theta$ wherein:

$A$ = the difference in the coefficients of thermal linear expansion of the materials of which each piece is comprised, in the axial direction;

$\Delta T$ = the operating temperature of the connection minus ambient temperature; and $\theta$ = the acute angle formed by the loaded face of the thread of either piece with the axes, said radial clearance increasing in the direction of the loading of the piece having the higher coefficient of thermal linear expansion.

8 Claims, 7 Drawing Figures

THREADED CONNECTIONS

FIELD OF THE INVENTION

This invention relates to threaded connections and, more particularly, to threaded connections adapted for use at elevated temperatures.

DESCRIPTION OF THE PRIOR ART

Threaded connections between parts having different coefficients of thermal linear expansion frequently exhibit surprisingly low strengths at elevated temperatures. This is particularly true where the expansion coefficients are substantially different as, for example, in graphite to metal connections, so much so that joints of this kind sometimes break without any external load. The problem results from the very low strength and non-ductile nature, in this case, of graphite and the great difference in thermal expansion between graphite and most metals of interest for high temperature service.

The problem is readily apparent in the case of a threaded connection used in rotating gas distributing apparatus, which is employed in the refining of molten metals and is referred to in U.S. Pat. No. 3,870,511. A two-part shaft is utilized in the rotating gas distributor, the upper shaft being made of metal and the lower shaft of graphite. These shafts are connected by a threaded joint of the type shown in FIG. 3 (but untapered) through which the upper shaft drives the lower shaft. The direction of the drive is such as to tighten the joint, which must transmit the desired torque as well as withstand bending and tensile forces. When a one-inch diameter joint is heated from ambient temperature to 1300° F., the metal male thread, e.g., "Inconel" 600 alloy, will expand about 8 mils more in diameter than the graphite female thread. If the initial diameter clearance is only 2 mils, as it can be with standard thread fits, then the metal part tries to expand the graphite 6 mils more. This develops a stress that cracks the graphite.

To overcome this problem, it was proposed that a radial clearance of at least the amount of the radial expansion differential expected be effected. It was found, however, that there was also an axial expansion differential, which resulted in a thread on the metal shaft having a greater pitch than the opposing thread on the graphite when the joint was at the elevated temperature. Thus the metal thread at the top pushed up on the mating graphite thread while the metal thread at the bottom pushed down on its mating thread, again placing an unacceptable stress on the graphite.

To prevent the metal thread from exerting this force on the graphite, it was then proposed to provide an even greater radial clearance than necessary to compensate for the radial expansion differential. Then, the only contact, at operating temperatures, was provided by the metal thread at the top pushing up on the mating graphite thread. This minimal contact results in high stresses on the graphite at this point. A modest torque will cause the graphite thread to shear, thus transferring all of the load to the next graphite thread, which then shears, and so on down the line of threads until the joint fails completely.

SUMMARY OF THE INVENTION

An object of this invention, therefore, is to provide an improvement in previously known threaded connections, which adapt the connection for use at elevated temperatures temperatures in such a manner that stresses caused by differences in coefficients of thermal expansion of the members are minimized and a rotary load may be applied in a uniform, predictable manner without the failure previously encountered. In other words, the connection will be able to withstand the stresses of bending, tension, and torsion applied at the designed elevated operating temperature.

Other objects and advantages will become apparent hereinafter.

According to the present invention such an improvement in a threaded connection, which is to be loaded in an axial direction and comprises two pieces (i) having coincidental axes and (ii) having different coefficients of thermal linear expansion, one piece being a threaded male piece and the other piece a threaded female piece, has been discovered.

The improvement comprises providing, at ambient temperature, a taper such that the change in radial clearance per unit length between the opposing threads of each piece is equal to the expression $A \Delta T \tan \theta$ wherein:

$A$ = the difference in the coefficients of thermal linear expansion of the materials of which each piece is comprised, in the axial direction;

$\Delta T$ = the operating temperature of the connection minus ambient temperature; and $\theta$ = the acute angle formed by the loaded face of the thread of either piece with the axes, said radial clearance increasing in the direction of the loading of the piece having the higher coefficient of thermal expansion.

It is understood that the thermometric scales, usually Fahrenheit or Centrigrade, on which the coefficients are based and for the operating and ambient temperature should be consistent.

Figure 1:
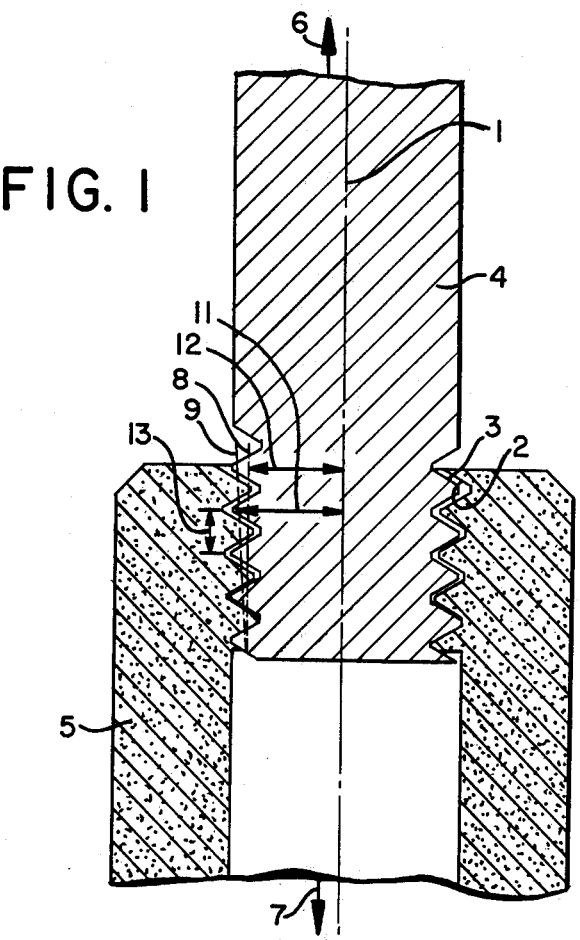
FIG. 1 is a schematic diagram of a cross-section of one embodiment of the invention.

In all of the figures the radial clearance and taper have been greatly exaggerated for the purpose of illustration and, further, are not drawn to scale. In actual practice the taper is usually too small to be visible to the naked eye.

DESCRIPTION OF THE PREFERRED EMBODIMENT

The threaded connection upon which the improvement is made is, except for the defined taper, in all respects conventional, the most common applications being in nuts and bolts. The standard screw thread has a thread angle of sixty degrees and this thread angle as well as others can be used in both pieces of the threaded connection. Most conventional applications place an axial load on the connection. That the axes of the two pieces (threads) which make up the threaded joint are coincidental is clear from the drawing, and for many applications these axes are the same as the axes of the cylinders from which the threaded pieces were cut. The axes are also considered to be the center line for angle and radial measurements.

Coefficients of thermal linear expansion are well-known constants which designate the amount of expansion under applied heat for specific materials. They are available in numerous technical handbooks as well as from the manufacturers of the particular materials or they can be ascertained by conventional techniques. The coefficients of particular interest here are for metals commonly used in high temperature applications and for non-metallic products such as graphite also used at high temperatures. Some examples of metal alloys and non-metallic materials for high temperature service and their thermal expansion coefficients (microinches per inch per °F.) are "Inconel" 600 (nickel-chromium alloy) 8.4; L-605 (cobalt-chromium alloy) 8.0; AISI Type 304 stainless steel 10.2; Type CS graphite (manufactured by Union Carbide Corporation) (2 inch diameter extruded rod) 0.70, parallel to extrusion direction (axial), and 1.8, perpendicular to extrusion direction; silicon carbide 2.5; fused quartz 0.29; mullite 3.0.

In carrying out this invention, either the threaded male piece or the threaded female piece can have the higher coefficient and the axial load can be applied in either direction, each of these instances being accommodated by the defined taper. Further, the radial clearance variation can be provided by placing the taper on either the male or female piece, the untapered piece bearing the straight thread, or by tapering both the male and female piece to give the proper rate of change in radial clearance.

Where the male piece has a lower coefficient than the female piece, there is no prescribed minimum radial clearance. Consequently, the radial clearance can be zero, but is, as a practical matter, slightly greater than zero so as to provide for ease of assembly. In the opposite circumstance, however, a minimum radial clearance is preferred and that is where the female piece has a lower coefficient of thermal expansion that the male piece. This preferred minimum radial clearance is equal to the expression $BC\Delta T$ wherein:

B = the pitch radius of the thread of any one of the pieces (the difference in pitch radius between each piece being infinitesimal).

C = the difference in the expansion coefficients of the materials of which each piece is comprised, in the radial direction; and $\Delta T$ = the operating temperature of the connection minus the ambient temperature.

It will be understood by those skilled in the art that the taper is uniform along the length of the threaded piece to which it is applied, and that this may be accomplished through the use of a tapered tap for the female thread or a tapered die for the male thread or either may be cut on a lathe. Threads on non-machinable materials can be made by grinding or molding. It is preferred that the taper be placed on only one of the pieces. The application of tapers to threaded pieces is, of course, well known both in pipe fitting to prevent leaks and in the connection of comparatively weak materials, but, in these cases, the male piece and female piece are tapered the same amount so that there is no change in radial clearance along the length of thread engagement.

The operating temperature of subject connection is generally above ambient, typically above 1000° F. The only important factor here is that the temperature at which it is desired to use the connection be known so that the proper radial clearance and taper can be built into the joint. This may be referred to as the designed operating temperature. Ambient temperature, on the other hand, is the temperature at which the threads are measured and is usually the temperature of the room in which the pieces are made.

Those skilled in the art will understand that when the male piece has the lower coefficient of thermal expansion such as graphite, heat-up to operating temperature will cause the clearance to increase in the radial direction. In a joint of the type shown on FIG. 6, this is offset to some degree by the difference in longitudinal expansion. The effect of the difference in longitudinal or axial expansion in offsetting the difference in radial expansion increases with the distance from the seating surface 29 until at some point, which in this specification will be called the "neutral point," there is no net loosening or tightening of the thread. This is the point at which the piece having the higher coefficient, in this case the female piece, moves outward and upward, in relation to the male piece which sits below the female piece, in amounts that give a resultant motion that is parallel to the thread face. Thus, at any point below the neutral point the thread is loosened and at any point above the neutral point the thread is tightened. If the distance from the neutral point to the seating surface is X, then:

$$X = (BC)/(2A \tan \theta)$$

wherein A, B, C and $\theta$ are as defined above.

Assuming that the taper has been applied according to $A\Delta T \tan \theta$ with the radial clearance increasing in the proper direction, the particular joint under discussion, i.e., the male piece having the lower coefficient, when heated to operating temperature will become loose and must be retightened at the selected temperature if a tight joint is desired. This requirement of retightening can be avoided, however, by eliminating the thread (see FIG. 7) on either or both pieces beginning at the neutral point for the distance X to the seating surface. If this joint is assembled with a very light torque, only the thread at the neutral point, in this case the lower thread, is in contact. As the joint is heated, the loading on this thread will not change, but the clearance or gap between the threads above this contact will decrease. At the design operating temperature the same light contact is obtained on all threads. If a tight joint at operating temperature is required, the threaded connection can be assembled with a predetermined torque or tightened a given angular amount past the point of initial contact. Then, at the operating temperature all threads will be loaded.

Figure 3:
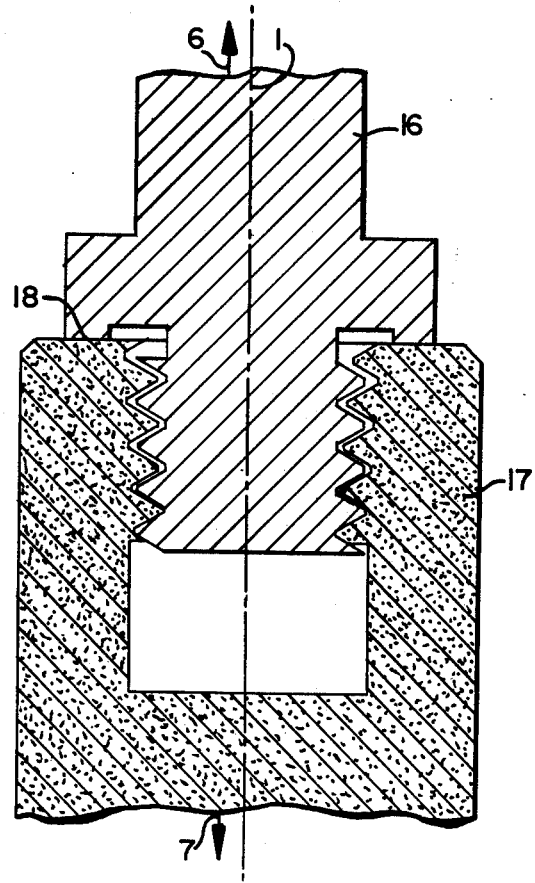
FIGS. 3, 4, 5, 6, and 7 are schematic diagrams of cross-sections of other embodiments of the invention.
Figure 4:
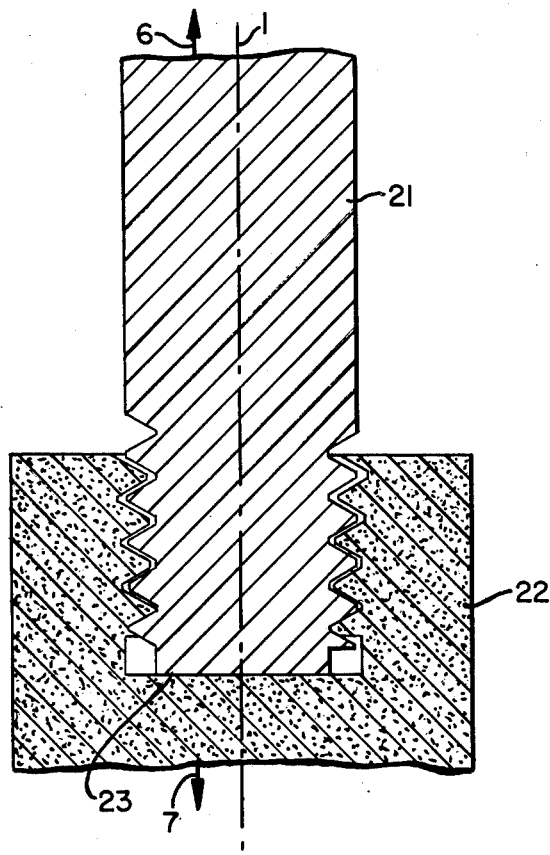

The concept of a neutral point may also be applied to the joint of FIG. 3, in which the male thread has the higher expansion coefficient. If the thread engagement extends just to the neutral point, which is at a distance X (as defined above) from seating surface 18 (by terminating either or both threads at this point) the joint will neither loosen or tighten when it is heated. If the thread engagement extends beyond the neutral point, the joint will loosen when heated. If the thread engagement terminates short of the neutral point, the joint will tighten when heated.

Referring to the drawing:

FIG. 1 is a side view of a threaded connection wherein male piece 4 has a higher coefficient of expansion than female piece 5. Load direction 6 is shown for male piece 4 while load direction 7 is shown for female piece 5. Coincidental axes or center line 1 can be observed to correspond to the axes of the cylinders from which the pieces are made. Faces 2 and 3 represent the load bearing faces of the female piece 5 and male piece 4, respectively. Pitch line 8 is that of male piece 4 while pitch line 9 is that of female piece 5. Pitch radius 12 is that of the male thread and pitch radius 11 is that of the female thread. Pitch 13 indicates the pitch of the female thread, the pitch of the male thread, of course, being measured in the same fashion. It is noted here that all of the figures of the drawing show connections at ambient temperature.

Figure 2:
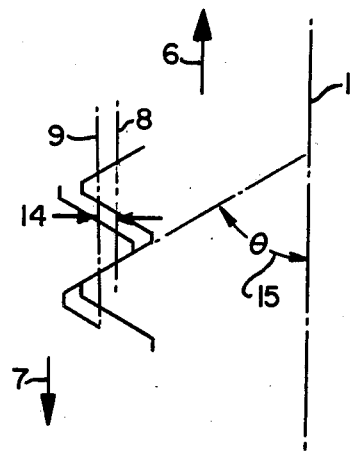
FIG. 2 is a blown up portion of a cross-section similar to that in FIG. 1.

FIG. 2 is a blown-up portion of a threaded connection similar to that shown in FIG. 1. Center line 1, pitch lines 8 and 9, and load directions 6 and 7 are the same as in FIG. 1. It will be observed that radial clearance 14 is indicated as the distance between pitch lines 8 and 9 along a line perpendicular to the center lines. Angle 15 is represented by the symbol for the Greek letter theta and has been defined previously.

Figure 5:
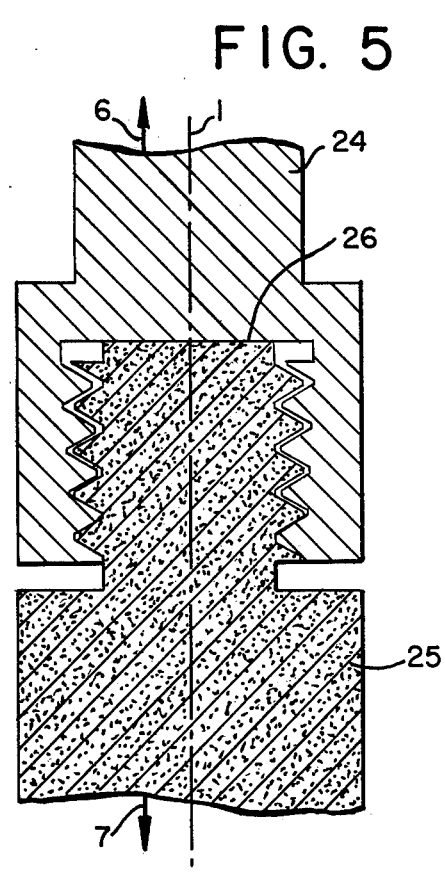
Figure 6:
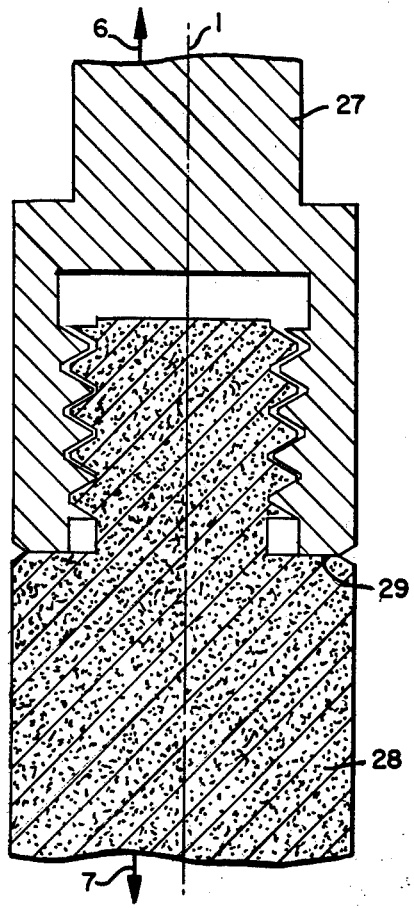
Figure 7:
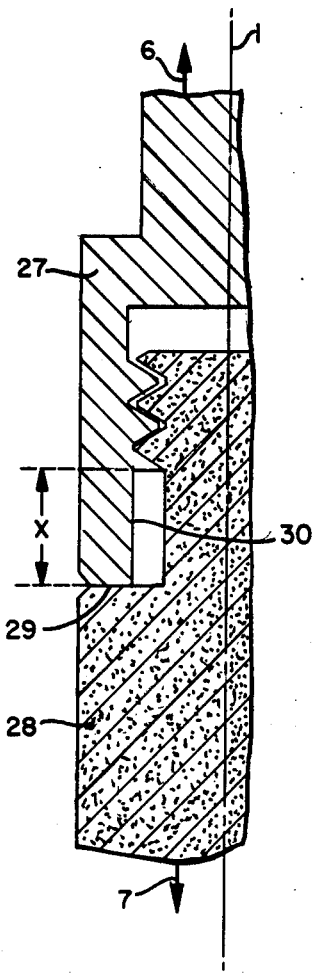

FIGS. 3 to 7 all show center lines 1 and load directions 6 and 7 as in FIGS. 1 and 2. In FIG. 3, male piece 16 has a higher coefficient of expansion than female piece 17 and also bears seating surface 18 which lies against the surface of the female piece. In FIG. 4, male piece 21 is again the high expansion material with female piece 22 being the low expansion material. Here, seating surface 23 of piece 21 lies against the inner surface of piece 22 differing from the external seating of FIG. 3. In FIG. 5, female piece 24 has a higher coefficient of expansion than male piece 25, seating surface 26 of male piece 25 lying against the internal surface of the female piece. The opposite taper directions in FIGS. 4 and 5 in terms of male and female pieces should be noted, the radial clearance always increasing in the direction of the loading of the piece having the higher coefficient of thermal expansion. In FIG. 6, the male piece is 28 and the female piece is 27, the latter having the higher coefficient. Seating surface 29 of male piece 28 lies against the external surface of the female piece differing in that respect from FIG. 5. FIG. 7 shows a side of FIG. 6 and only differs in threadless portion 30 which runs from the neutral point a distance of X to the seating surface. The formula for X is noted and discussed above. Here, the thread has been eliminated from both the male and the female piece.

It will be understood that although the seating surface has been described as part of the male piece, it abuts, when the joint is tightened, its counterpart on the female piece, which can also be considered a seating surface. The distance X runs between this abutment and the neutral point. In FIGS. 3 through 6 the threads have been shown with undercuts as they would normally be made by practical thread cutting methods. The length of this undercut will have some effect on the performance of the joints shown in FIGS. 4 and 6, but it is assumed here that this length is so small that it has no practical effect. Further, in FIGS. 3 through 7, the thread direction (right hand or left hand) is chosen so that the transmitted torque tends to tighten the joint. When the joint is so tightened the two pieces will be loaded axially in directions 6 and 7. This, of course, is not meaningful where there is no transmitted torque other than that used to connect the two pieces together.

EXAMPLE

At the beginning of this specification, a rotating gas distributor is referred to and a joint of the type shown in FIG. 3 is mentioned in connection therewith. This example is concerned with a comparison between the problem joint referred to above and a two-part shaft made according to this invention and adapted for use in the rotating gas distributor, the joint of which is constructed in the same manner as the threaded connection in FIG. 3.

The upper shaft of the problem joint, again, is made of "Inconel" 600 alloy. The lower shaft, which is 1.75 inches in outside diameter is machined from 2 inch diameter Type CS extruded graphite. The thread that connects the two pieces is designated as ⅞-9UNC-2 A and 2B (⅞ inch nominal outside diameter, 9 threads per inch, Unified National Course to tolerance range 2A external and 2B internal). This allows a diametral clearance of 0.002 to 0.016 inch or a radial clearance of 0.001 to 0.008 inch. The thread engagement length is about 1.2 inches. These parts are measured and assembled at 70° F. and are then heated up to and operated at a temperature of 1170° F. A large proportion of joints made and operated in this manner failed by a splitting of the graphite in the threaded area. A portion of these failed on heat-up prior to actual operation.

The thread in the graphite piece of the problem joint is then tapered as in FIG. 3. The first parts are threaded on a lathe and subsequent parts are cut with a tapered tap. The diametral or included taper used is 0.030 inch per inch of length, which is twice the radial clearance change per inch of length as calculated by the formula noted above, i.e., radial clearance per unit of length = $A \Delta T \tan \theta$, using a thermal linear expansion coefficient for the graphite of 0.70 (the value in the axial direction or parallel to the extrusion direction) and 8.7 for the "Inconel" 600 alloy (again, the value in the axial direction). The minimum diametral clearance is kept in the range of 0.006 to 0.010 inch. The thermometric scale is Fahrenheit, the angle $\theta$ is 60°, assembly is at 70° F., and operation is at 1170° F. Operation of these joints eliminates heat-up failures altogether and essentially eliminates operating failures. Further, the operating life of the threaded connection is extended severalfold.

I claim:

1. In a threaded connection to be loaded in an axial direction, said connection comprising two pieces (i) having coincidental axes and (ii) having different coefficients of thermal linear expansion wherein one piece is a threaded male piece and the other piece is a threaded female piece.

the improvement comprising providing, at ambient temperature, a taper such that the change in radial clearance per unit of length between the opposing threads of each piece is equal to the expression $A \Delta T \tan \theta$ wherein:

A = the difference in the coefficients of thermal linear expansion of the materials of which each piece is comprised in the axial direction;

$\Delta T$ = the operating temperature of the connection minus ambient temperature; and $\theta$ = the acute angle formed by the loaded face of the thread of either piece with the axes said radial clearance increasing in the direction of the loading of the piece having the higher coefficient of thermal linear expansion.

2. The connection defined in claim 1 wherein the male piece has a higher coefficient of thermal expansion than the female piece.

3. The connection defined in claim 1 wherein the female piece has a higher coefficient of thermal expansion than the male piece.

4. The connection defined in claim 2 wherein the minimum radial clearance is equal to the expression $BC\Delta T$ wherein:

B = pitch radius of the thread of any one of the pieces;
C = the difference in the coefficients of thermal linear expansion of the materials of which each piece is comprised, in the radial direction; and
ΔT = the same as stated above.

5. The connection defined in claim 4 wherein the male piece is metal and the female piece is graphite.

6. The connection defined in claim 3 wherein the male piece is graphite and the female piece is metal.

7. The connection defined in claim 3 wherein the male and female piece abut each other externally to provide a seating surface, at least one piece of such connection having a threadless portion running from the seating surface a distance of X, X being equal to (BC/2A tan $\theta$)
wherein B = the pitch radius of the thread of any one of the pieces;
C = the difference in the coefficients of thermal linear expansion of the materials of which each piece is comprised, in the radial direction; and
A and $\theta$ are the same as stated above.

8. The connection defined in claim 2 wherein the male and female piece abut each other externally to provide a seating surface, at least one piece of such connection having a threaded portion running from the seating surface a distance of X, X being equal to (BC)/2A tan $\theta$)
wherein B = the pitch radius of the thread of any one of the pieces;
C = the difference in the coefficients of thermal linear expansion of the materials of which each piece is comprised, in the radial direction; and
A and $\theta$ are the same as stated above.

* * * * *

UNITED STATES PATENT AND TRADEMARK OFFICE
CERTIFICATE OF CORRECTION

PATENT NO. : 4,191,486
DATED : March 4, 1980
INVENTOR(S) : John F. Pelton

It is certified that error appears in the above—identified patent and that said Letters Patent is hereby corrected as shown below:

At column 3, lines 12, 13, 15, 16, and 17 and column 6, lines 28 and 29, after each of the numbers "8.4", "8.0", "10.2", "0.70", "1.8", "2.5", "0.29", "3.0", "0.70", and "8.7", insert --times $10^{-6}$--.

At column 8, line 8, change "threaded" to --threadless--.

Signed and Sealed this

Seventh Day of September 1982

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,191,486
DATED : March 4, 1980
INVENTOR(S) : John F. Pelton

It is certified that error appears in the above—identified patent and that said Letters Patent is hereby corrected as shown below:

At column 3, lines 12, 13, 15, 16 and 17 after each of the numbers "8.4", "8.0", "10.2", "0.70". "1.8", "2.5", "0.29", and "3.0", delete --times $10^{-6}$--.

At column 8, line 8, change "threaded" to -- threadless --.

This certificate supersedes Certificate of September 7, 1982,

Signed and Sealed this

Fifteenth Day of February 1983

[SEAL]

Attest:

Attesting Officer

GERALD J. MOSSINGHOFF

Commissioner of Patents and Trademarks